US012165453B2

(12) United States Patent
Ufkes et al.

(10) Patent No.: US 12,165,453 B2
(45) Date of Patent: *Dec. 10, 2024

(54) SITUATIONALLY CONDITIONAL ELECTRONIC ACCESS CONTROL SYSTEM AND METHOD

(71) Applicant: Security Enhancement Systems, LLC, Northbrook, IL (US)

(72) Inventors: Philip J. Ufkes, Sullivan's Island, SC (US); Matthew Frank Trapani, Deerfield, IL (US); Stacey Lee Krutz-Sabol, Attica, MI (US); Mark Williams, Northbrook, IL (US)

(73) Assignee: Security Enhancement Systems, LLC, Northbrook, IL (US)

( * ) Notice: Subject to any disclaimer, the term of this patent is extended or adjusted under 35 U.S.C. 154(b) by 219 days.

This patent is subject to a terminal disclaimer.

(21) Appl. No.: 17/833,720

(22) Filed: Jun. 6, 2022

(65) Prior Publication Data

US 2022/0375292 A1 Nov. 24, 2022

Related U.S. Application Data

(63) Continuation of application No. 17/065,826, filed on Oct. 8, 2020, now Pat. No. 11,354,956.

(60) Provisional application No. 62/912,492, filed on Oct. 8, 2019.

(51) Int. Cl.

*G07C 9/22* (2020.01)
*G07C 9/00* (2020.01)

(52) U.S. Cl.

CPC ........... *G07C 9/22* (2020.01); *G07C 9/00309* (2013.01); *G07C 9/00571* (2013.01); *G07C 2009/00769* (2013.01); *G07C 2209/62* (2013.01)

(58) Field of Classification Search

CPC .............................. G07C 9/22; G07C 9/00571
See application file for complete search history.

(56) References Cited

U.S. PATENT DOCUMENTS

| | | | | |
|---|---|---|---|---|
| 6,799,209 | B1 * | 9/2004 | Hayton | H04L 67/535 709/217 |
| 7,131,132 | B1 * | 10/2006 | Gehlot | H04H 60/33 713/168 |
| 10,222,119 | B2 * | 3/2019 | Rezayat | G06Q 10/087 |

(Continued)

*Primary Examiner* — Daniell L Negron

(74) *Attorney, Agent, or Firm* — Gregory Finch; Finch Paolino, LLC

(57) ABSTRACT

An electronic access control system and method that enables conditional access to electronic locking systems according to user-based and situation-based safety parameters. Aspects of the present disclosure provide for a mobile access interface whereby the network operations center can assess a safety risk for a service site based on a combination of user-generated inputs, sensor inputs and/or external data inputs. The system may comprise a dynamic rules engine configured to dynamically determine safety and compliance associated with an access-restricted area. If the access-restricted area is safe, the system may enable access according to one or more access protocols. If the access-restricted area is unsafe, or the user requesting access is not in compliance with one or more static or dynamic safety parameters, the system may disable standard access protocols and deny access to the requesting party.

14 Claims, 19 Drawing Sheets

(56) References Cited

U.S. PATENT DOCUMENTS

| | | | | |
|---|---|---|---|---|
| 10,282,927 | B1 * | 5/2019 | Hutz | G07C 9/20 |
| 10,360,744 | B1 * | 7/2019 | Kerzner | H04N 7/185 |
| 10,600,138 | B2 * | 3/2020 | Stortstrom | G06V 20/653 |
| 11,354,956 | B2 * | 6/2022 | Ufkes | G07C 9/22 |
| 2008/0136649 | A1 * | 6/2008 | Van De Hey | E03C 1/057 340/5.2 |

* cited by examiner

SITUATIONALLY CONDITIONAL ELECTRONIC ACCESS CONTROL SYSTEM AND METHOD

CROSS-REFERENCE TO RELATED APPLICATIONS

This application is a continuation of U.S. patent application Ser. No. 17/065,826 entitled SITUATIONALLY CONDITIONAL ELECTRONIC ACCESS CONTROL SYSTEM AND METHOD, filed on Oct. 8, 2020, which claims priority benefit of U.S. Provisional Application Ser. No. 62/912,492 entitled SITUATIONALLY CONDITIONAL ELECTRONIC ACCESS CONTROL SYSTEM AND METHOD and filed on Oct. 8, 2019, the entireties of which are incorporated herein at least by virtue of this reference.

FIELD

The present disclosure relates to the field of electronic access control systems and methods; in particular, an electronic access control system and method that enables conditional access to electronic locking systems according to user-based and situation-based safety parameters.

BACKGROUND

There are many situations where field service technicians for telecommunications towers need to service equipment at a tower site, where they often face high risk safety hazards related to weather, arc flashes, RF exposure and other conditions. In addition, depending on what kind of service work needs to be performed, the technician is required to have certain certifications active during the time of the work as well as certain personal safety equipment.

The inability for a company and/or individual to understand and uphold the compliance requirements for hired third-party contractors, particular high-risk service work, has severe safety, risk and financial ramifications. As a result, a novel solution that ensures real-time compliance by controlling access to the performance of high-risk work is greatly needed in the industry.

Such high-risk work may include, for example, service work performed on wireless towers during initial construction and routine maintenance including the replacement or upgrade of existing equipment that requires technicians to climb towers. Sometimes climbing is needed during conditions that add risk due to poor weather conditions such as extreme cold or heat, ice, high winds and sometime even lightning strikes. This type of service work on telecommunications towers may therefore be considered among the most dangerous jobs in America.

Currently, technicians are often allowed to access sites, towers and indoor or outdoor enclosures under dangerous safety conditions that also may require compliance adherence. Failure to manage these safety and/or compliance situations risks lives and poses significant financial risk for all companies involved. Through applied effort, ingenuity, and innovation, Applicant has identified a number of deficiencies and problems with electronic access to telecommunications tower sites and other dangerous service sites. Applicant has developed a solution that is embodied by the present invention, which is described in detail below.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

An object of the present disclosure is an electronic access control system and method that enables conditional access to electronic locking systems according to user-based and situation-based safety parameters. Aspects of the present disclosure provide for a mobile access control interface via which a network operations center can assess a safety risk for a service site based on a combination of user-generated inputs, sensor inputs and/or external data inputs. The system may comprise a dynamic rules engine configured to dynamically determine safety and compliance associated with an access-restricted area. If the access-restricted area is safe, the system may grant access to a requesting user according to one or more access protocols. If the access-restricted area is unsafe, or the user requesting access is not in compliance with one or more static or dynamic safety or compliance parameters, the system may disable standard access protocols and deny access to the party requesting access.

Embodiments of the present disclosure enable a system for conditional electronic access to service sites posing a high level of safety risk and/or requiring a high degree of safety compliance (or other sensitive or conditional access restrictions). Aspects of the present disclosure provide for a system comprising a mobile software application executing on a mobile electronic device being communicably engaged with an application server to enable the system to assess a safety risk presented by a service site based on a combination of user-generated inputs, sensor inputs, and/or external data inputs. The system may comprise a dynamic rules engine configured whether a user request to access an access restricted area is safe/unsafe and or compliant/non-compliant. If the access-restricted area is safe, the system may enable access according to standard access protocols (e.g. key card, passcode, etc.). If the access-restricted area is unsafe, or the user requesting access is not in compliance with one or more static or dynamic safety or compliance parameters, the system may revoke standard access protocols and deny the user access to the site. In accordance with certain embodiments, electronic access to the site may be enabled via a wireless communications interface between a mobile electronic device communicably engaged with a remote server and a Bluetooth Low Energy (BLE) lock being configured to receive a communication from the mobile electronic device. In accordance with said embodiments, the system is configured to prevent a requesting user from entering an access restricted area if access to said area is unsafe or non-compliant with one or more compliance parameters or standard operating procedures. By preventing access to the access-restricted area under unsafe or non-compliant conditions, the system reduces the likelihood of safety-related incidents as well as reduces liability risk to companies who own and/or manage high-risk service sites.

Embodiments of the present disclosure comprise a Bluetooth Low Energy (BLE) lock that can optionally sense environmental conditions via one or more sensors. The BLE lock may be operably engaged with a smartphone application executing on a mobile electronic device and cloud/enterprise systems via one or more wireless communications interface. The system may receive and process a plurality of data inputs including one or more sensor inputs, internal database inputs, external database inputs including via one or more application programming interface (API), and user-generated inputs. The various data inputs may be processed by a rules engine executing on an application server to determine whether to grant an access request for the BLE lock or deny an access request for the BLE lock.

Embodiments of the present disclosure further provide for a mobile system for documenting and enforcing safety compliance rules in order to mitigate liability risk to companies who deploy service technicians to high-risk or security-sensitive service sites. Certain aspects of the present disclosure provide for one or more graphical user interface to enable one or more workflow for documenting and enforcing safety compliance rules by integrating remote access controls with one or more safety parameters, including detection of adverse weather environmental conditions; detection of arc flash environmental conditions; verification of technician certifications; verification of personal safety equipment usage; measurement of radio frequency ("RF") exposure; and the like.

Embodiments of the present disclosure provide for an electronic access control mobile application executing on a smart phone or other mobile electronic device. The mobile application may comprise a graphical user interface configured to prompt a user to provide a plurality of inputs corresponding to a plurality of safety or compliance conditions. In certain embodiments, the graphical user interface may comprise a compliance checklist. The compliance checklist may be configured to correspond to each access-controlled location, structure, and/or individual lock. The compliance checklist may be configured to prompt a plurality of compliance inputs from the user to determine whether to grant access to the user for the requested access-controlled location. The plurality of compliance inputs from the user may be stored in the application database and may be accessible via a compliance log to provide a record of the conditions under which the user was granted or denied access to the access-controlled location.

Certain aspects of the present disclosure provide for an electronic access control system comprising at least one computer processor configured to execute computer program instructions;

and a non-transitory computer-readable memory device communicably engaged with the at least one computer processor and having computer program instructions stored thereon that, when executed, cause the at least one computer processor to perform operations comprising providing a graphical user interface comprising one or more graphical elements configured to enable a user to electronically request access to at least one secured location, wherein the at least one secured location comprises at least one electronic access control device configured to selectively secure access to at least one entry point of the at least one secured location; providing, via the graphical user interface, at least one user prompt in response to a user request to access the at least one secured location, wherein the at least one user prompt is associated with one or more safety or compliance parameters for accessing the at least one secured location; receiving one or more user-generated inputs in response to the at least one user prompt; processing the one or more user-generated inputs to determine whether the one or more safety or compliance parameters are satisfied for the user request to access the at least one secured location; and communicating at least one wireless communications signal comprising access code data for the at least one secured location to a controller of the electronic access control device in response to determining that the one or more safety or compliance parameters are satisfied.

In accordance with certain embodiments of the electronic access control system, the one or more operations of the processor may further comprise establishing at least one wireless communications interface with the controller of the electronic access control device. In certain embodiments, the one or more operations may further comprise receiving at least one sensor data input from the controller of the electronic access control device. The one or more operations may further comprise processing the at least one sensor data input to determine at least one safety-related or environmental condition for the at least one secured location. In certain embodiments, the one or more operations may further comprise denying access to the at least one secured location in response to determining that the one or more safety or compliance parameters are not satisfied. In accordance with certain aspects of the present disclosure, the one or more safety or compliance parameters comprise one or more parameters selected from the group consisting of weather condition parameters, arc flash condition parameters, technician certification parameters, personal safety equipment parameters, and radio frequency exposure parameters. In accordance with certain embodiments, the one or more operations may further comprise establishing a communications interface with at least one remote server. In certain embodiments, the one or more operations may further comprise receiving at least one data input from the at least one remote server and processing the at least one data input to determine whether the one or more safety or compliance parameters are satisfied. In accordance with certain aspects of the present disclosure, the at least one data input may comprise weather data for the at least one secured location.

Further aspects of the present disclosure provide for an electronic access control system comprising an electronic access control device comprising a controller communicably engaged with an electronic locking mechanism, wherein the electronic access control device is configured to selectively secure access to at least one entry point of at least one secured location via the electronic locking mechanism; and a mobile computing device communicably engaged with the electronic access control device to communicate at least one electronic access code to the electronic access control device via at least one wireless communications interface, the mobile computing device comprising an input-output device comprising a display; a processor communicatively engaged with the input-output device of the mobile computing device; and a non-transitory computer readable medium communicatively engaged with the processor and having instructions stored thereon that, when executed, cause the processor to perform one or more operations of an electronic access control application, the one or more operations comprising providing a graphical user interface of the electronic access control application to the display, the graphical user interface comprising at least one safety and compliance workflow associated with the at least one secured location; receiving one or more user-generated inputs in response to the at least one safety and compliance workflow; processing the one or more user-generated inputs to determine whether one or more safety or compliance parameters for the at least one secured location are satisfied; and communicating the at least one electronic access code to the electronic access control device in response to determining that the one or more safety or compliance parameters are satisfied.

In accordance with certain embodiments, the electronic access control system may further comprise at least one remote server communicably engaged with the mobile computing device via at least one network interface, wherein the at least one remote server is configured to execute a server-side instance of the electronic access control application. In certain embodiments, the electronic access control system may further comprise at least one sensor communicably engaged with the electronic access control device, wherein the at least one sensor is configured to measure at least one safety-related or environmental condition for the at least one secured location. In certain embodiments, the one or more safety or compliance parameters may comprise one or more parameters selected from the group consisting of weather condition parameters, arc flash condition parameters, technician certification parameters, personal safety equipment parameters, and radio frequency exposure parameters. In certain embodiments, the one or more operations of the electronic access control application may further comprise receiving and processing at least one sensor input for the at least one sensor according to the one or more safety or compliance parameters. In certain embodiments, the one or more operations of the electronic access control application may further comprise denying access to the at least one secured location in response to determining that the one or more safety or compliance parameters are not satisfied.

Still further aspects of the present disclosure provide for an electronic access control method comprising presenting, with a mobile computing device communicably engaged with a remote server, a graphical user interface comprising an instance of an electronic access control application; requesting, with the mobile computing device, access to at least one secured location, wherein the at least one secured location is selectively secured by at least one electronic access control device; presenting, with the mobile computing device via the graphical user interface, at least one safety and compliance workflow associated with one or more safety or compliance parameters for the at least one secured location; receiving, with the mobile computing device via the graphical user interface, one or more user-generated inputs in response to the at least one safety and compliance workflow; processing, with the mobile computing device in communication with the remote server, the one or more user-generated inputs to determine whether one or more safety or compliance parameters for the at least one secured location are satisfied; and communicating, with the mobile computing device via a wireless communications interface, an electronic access code to the electronic access control device in response to determining that the one or more safety or compliance parameters are satisfied.

In accordance with certain aspects of the present disclosure, the electronic access control method may further comprise configuring, with the mobile computing device in communication with the remote server, the electronic access code to the electronic access control device in response to determining that the one or more safety or compliance parameters are satisfied. In certain embodiments, the electronic access control method may further comprise denying, with the mobile computing device in communication with the remote server, the request to access the secured location in response to determining that the one or more safety or compliance parameters are not satisfied. In certain embodiments, the one or more safety or compliance parameters may comprise one or more parameters selected from the group consisting of weather condition parameters, arc flash condition parameters, technician certification parameters, personal safety equipment parameters, and radio frequency exposure parameters. In certain embodiments, the electronic access control method may further comprise retrieving, with the remote server, current or future weather data for a geographic area associated with the at least one secured location and processing the current or future weather data to determine whether the one or more safety or compliance parameters are satisfied.

The foregoing has outlined rather broadly the more pertinent and important features of the present invention so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF DRAWINGS

The above and other objects, features and advantages of the present disclosure will be more apparent from the following detailed description taken in conjunction with the accompanying drawings, in which.

DETAILED DESCRIPTION

Figure 1:
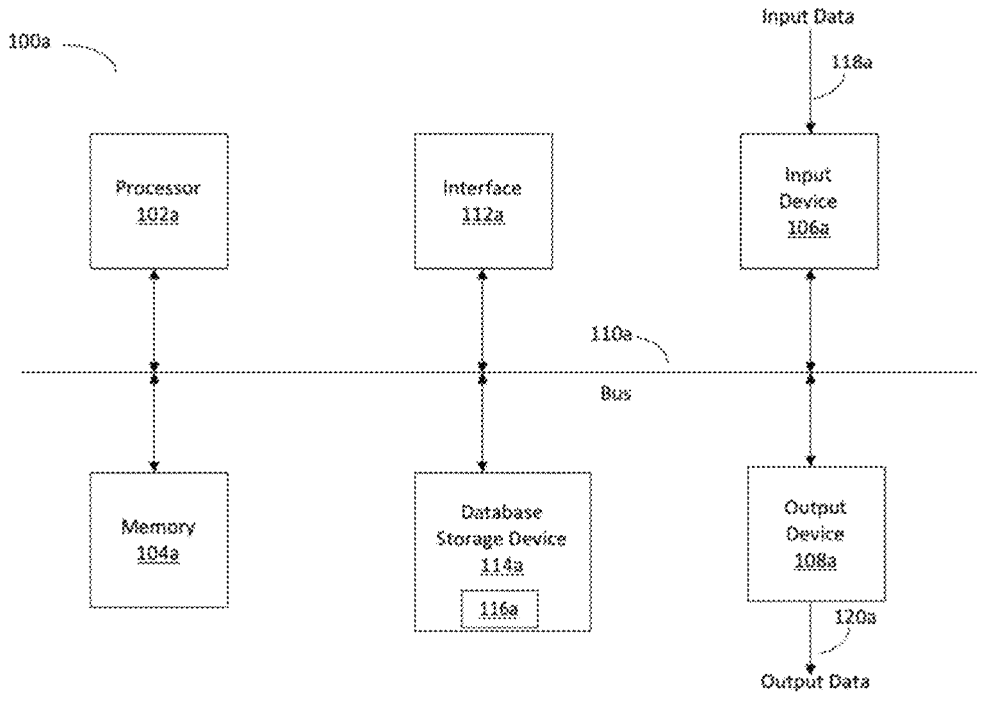
FIG. 1 is an illustrative embodiment of a computing device through which one or more aspects of the present disclosure may be implemented.

It should be appreciated that all combinations of the concepts discussed in greater detail below (provided such concepts are not mutually inconsistent) are contemplated as being part of the inventive subject matter disclosed herein. It also should be appreciated that terminology explicitly employed herein that also may appear in any disclosure incorporated by reference should be accorded a meaning most consistent with the particular concepts disclosed herein.

Following below are more detailed descriptions of various concepts related to, and embodiments of, inventive methods, apparatus and systems configured to provide for situationally conditional electronic access control for a secured location according to one or more verified safety and compliance parameters. Certain embodiments of the present disclosure may incorporate one or more mobile computing device communicably engaged with an electronic access control device over a wireless communications interface and a remote server via a network interface. The mobile computing device may comprise a mobile electronic access control application comprising a graphical user interface configured to enable a user to request access to the secured location and provide one or more user-generated inputs in response to at least one safety and compliance workflow associated with the secured location. In accordance with various embodiments, the at least one safety and compliance workflow is configured to determine whether one or more safety or compliance parameters for the secured location and/or the user are satisfied before the user is granted access to the secured location.

It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes. The present disclosure should in no way be limited to the exemplary implementation and techniques illustrated in the drawings and described below.

Where a range of values is provided, it is understood that each intervening value, to the tenth of the unit of the lower limit unless the context clearly dictates otherwise, between the upper and lower limit of that range and any other stated or intervening value in that stated range is encompassed by the invention. The upper and lower limits of these smaller ranges may independently be included in the smaller ranges, and are also encompassed by the invention, subject to any specifically excluded limit in a stated range. Where a stated range includes one or both of the endpoint limits, ranges excluding either or both of those included endpoints are also included in the scope of the invention. As used herein, "exemplary" means serving as an example or illustration and does not necessarily denote ideal or best.

As used herein, the term "includes" means includes but is not limited to, the term "including" means including but not limited to. The term "based on" means based at least in part on.

As used herein, the term "packet" refers to any formatted unit of data that may be sent and/or received by an electronic device.

As used herein, the term "payload" refers to any part of transmitted data that constitutes an intended message and/or identifying information.

As used herein, the term "access control system" or "electronic access control system" refers to any system for restricting entrance to a property, a building, an area, a container, and/or a room to authorized persons through the use of at least one electronic access control device.

As used herein, the term "electronic access control device" or "access control device" refers to any electronic device that may be a component of an access control system, including: an access control panel (also known as a controller); an access-controlled entry, such as a door, turnstile, parking gate, elevator, or other physical barrier; a reader installed near the entry/exit of an access-controlled area; locking hardware, such as electric door strikes, electromagnetic locks, and electronically-actuated mechanical locks; a magnetic door switch for monitoring door position; and request-to-exit (REX) devices for allowing egress.

As used herein, the term "interface" refers to any shared boundary across which two or more separate components of a computer system may exchange information. The exchange can be between software, computer hardware, peripheral devices, humans, and combinations thereof.

As used herein, the term "native" refers to any software program that is installed on a mobile electronic device.

Turning now descriptively to the drawings, in which similar reference characters denote similar elements throughout the several views, FIG. 1 depicts an exemplary general-purpose computing system in which illustrated embodiments of the present invention may be implemented.

A generalized computing embodiment in which the present invention can be realized is depicted in FIG. 1 illustrating a processing system **100*a* which generally comprises at least one processor 102*a*, or processing unit or plurality of processors, memory 104*a*, at least one input device 106*a* and at least one output device 108*a*, coupled together via a bus or group of buses 110*a*. In certain embodiments, input device 106*a* and output device 108*a* could be the same device. An interface 112*a* can also be provided for coupling the processing system 100*a* to one or more peripheral devices, for example interface 112*a* could be a PCI card or PC card. At least one storage device 114*a* which houses at least one database 116*a* can also be provided. The memory 104*a* can be any form of memory device, for example, volatile or non-volatile memory, solid state storage devices, magnetic devices, etc. The processor 102*a* could comprise more than one distinct processing device, for example to handle different functions within the processing system 100*a*. Input device 106*a* receives input data 118*a* and can comprise, for example, a keyboard, a pointer device such as a pen-like device or a mouse, audio receiving device for voice controlled activation such as a microphone, data receiver or antenna such as a modem or wireless data adaptor, data acquisition card, etc. Input data 118*a* could come from different sources, for example keyboard instructions in conjunction with data received via a network. Output device 108*a* produces or generates output data 120*a* and can comprise, for example, a display device or monitor in which case output data 120*a* is visual, a printer in which case output data 120***a* is printed, a port for example a USB port, a peripheral component adaptor, a data transmitter or antenna such as a modem or wireless network adaptor, etc. Output data 120*a* could be distinct and derived from different output devices, for example a visual display on a monitor in conjunction with data transmitted to a network. A user could view data output, or an interpretation of the data output, on, for example, a monitor or using a printer. The storage device 114*a* can be any form of data or information storage means, for example, volatile or non-volatile memory, solid state storage devices, magnetic devices, etc.

In use, the processing system 100*a* is adapted to allow data or information to be stored in and/or retrieved from, via wired or wireless communication means, at least one database 116*a*. The interface 112*a* may allow wired and/or wireless communication between the processing unit 102*a* and peripheral components that may serve a specialized purpose. In general, the processor 102*a* can receive instructions as input data 118*a* via input device 106*a* and can display processed results or other output to a user by utilizing output device 108*a*. More than one input device 106*a* and/or output device 108*a* can be provided. It should be appreciated that the processing system 100*a* may be any form of terminal, server, specialized hardware, or the like.

It is to be appreciated that the processing system 100*a* may be a part of a networked communications system. Processing system 100*a* could connect to a network, for example the Internet or a WAN. Input data 118*a* and output data 120*a* could be communicated to other devices via the network. The transfer of information and/or data over the network can be achieved using wired communications means or wireless communications means. A server can facilitate the transfer of data between the network and one or more databases. A server and one or more databases provide an example of an information source.

Thus, processing system 100*a* illustrated in FIG. 1 may operate in a networked environment using logical connections to one or more remote computers. The remote computer may be a personal computer, a server, a router, a network PC, a peer device, or other common network node, and typically includes many or all of the elements described above.

It is to be further appreciated that the logical connections depicted in FIG. 1 include a local area network (LAN) and a wide area network (WAN) but may also include other networks such as a personal area network (PAN). Such networking environments are commonplace in offices, enterprise-wide computer networks, intranets, and the Internet. For instance, when used in a LAN networking environment, the computing system environment 100*a* is connected to the LAN through a network interface or adapter. When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the computing system environment 100*a*, or portions thereof, may be stored in a remote memory storage device. It is to be appreciated that the illustrated network connections of FIG. 1 are exemplary and other means of establishing a communications link between multiple computers may be used.

FIG. 1 is intended to provide a brief, general description of an illustrative and/or suitable exemplary environment in which embodiments of the below described present invention may be implemented. FIG. 1 is an example of a suitable environment and is not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

In the description that follows, certain embodiments may be described with reference to acts and symbolic representations of operations that are performed by one or more computing devices, such as the computing system environment 100*a* of FIG. 1. As such, it will be understood that such acts and operations, which are at times referred to as being computer-executed, include the manipulation by the processor of the computer of electrical signals representing data in a structured form. This manipulation transforms the data or maintains them at locations in the memory system of the computer, which reconfigures or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

Embodiments may be implemented with numerous other general-purpose or special-purpose computing devices and computing system environments or configurations. Examples of well-known computing systems, environments, and configurations that may be suitable for use with an embodiment include, but are not limited to, personal computers, handheld or laptop devices, personal digital assistants, multiprocessor systems, microprocessor-based systems, set top boxes, programmable consumer electronics, network, minicomputers, server computers, game server computers, web server computers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

With the exemplary computing system environment 100*a* of FIG. 1 being generally shown and discussed above, description will now turn towards illustrated embodiments of the present invention which generally relates to methods for facilitating a situationally conditional electronic access control method. It is to be understood and appreciated the methods involve providing a mobile software application comprising a graphical user interface comprising one or more conditional access workflows; executing a safety check for the access-restricted area; executing a compliance workflow comprising a plurality of compliance-specific user inputs; verifying a compliance condition according to the plurality of compliance-specific user inputs; an access permission to the mobile software application in response to verification of the compliance condition; and, communicating the access permission to an electronic locking device via the wireless communication interface to grant access to the access-restricted area.

Figure 2:
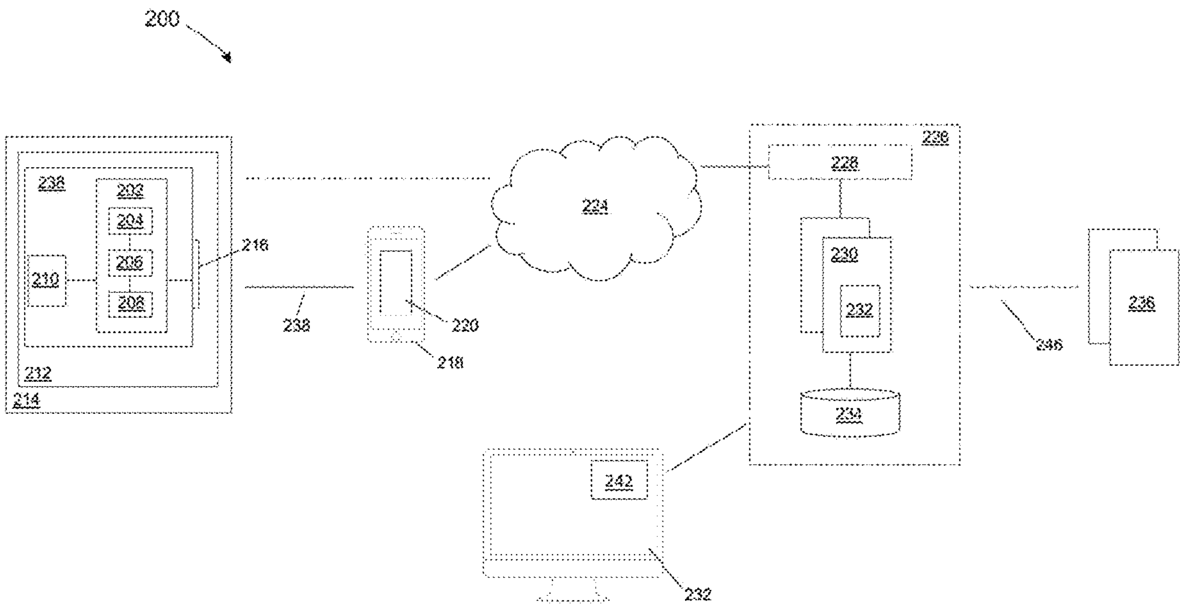
FIG. 2 is a diagram of a system architecture through which one or more aspects of the present disclosure may be implemented.

Referring now to FIG. 2, an architecture diagram of a situationally conditional electronic access control system 200 through which one or more aspects of the present disclosure may be implemented is shown. According to an embodiment, system 200 generally comprises an electronic lock 238 being operably secured to a door 212 configured to restrict access to an area or enclosure 214. Door 212 may comprise a door, gate, access panel, or other access control structure configured to restrict access to an area or enclosure. Electronic lock 238 may further comprise an access controller 202 comprising a processor 204, a memory device 206, and a wireless communications interface 208 (for example, a WiFi or Bluetooth chip, Near Field Communication (NFC), or other wireless communications interface); at least one sensor 210; and, an electronic actuator 216 comprising a mechanical or electromagnetic locking mechanism being configured to be operably engaged or disengaged to lock and unlock door 212 in response to a signal from access controller 202. Sensor 210 may comprise a weather sensor, an arc sensor or other sensor being configured to sense the one or more environmental condition, such as an arc flash, an electrical charge, moisture, temperature, and the like. Sensor 210 may be operably engaged with access controller 202 to provide sensor data to processor 204.

System 200 may further comprise a mobile electronic device 218 being communicably engaged with access controller 202 via a wireless communications interface 240. Wireless communications interface 240 may comprise one or more wireless communications means and/or protocols comprising WiFi, Bluetooth, NFC, radio frequency (RF), free-space optical communication, and the like. Mobile electronic device 218 may comprise any mobile processing system, such as processing system 100 as described in FIG. 1, and may be embodied as a smart phone, tablet computer, laptop computer, and the like. System 200 may further comprise a safety and compliance mobile application 220 executing on mobile electronic device 218. Safety and compliance mobile application 220 may be native to mobile electronic device 218 or may be accessed via an Internet browser interface of mobile electronic device 218. Safety and compliance mobile application 220 may comprise one or more graphical user interfaces comprising one or more safety and/or compliance workflows configured to solicit a plurality of safety and/or compliance inputs from a user (safety and compliance mobile application 220 being described in more detail below). Mobile electronic device 218 may be communicably engaged with one or more compliance and access server 230 via wireless communications network 224. Wireless communications network 224 may comprise a wireless Internet connection and/or a wireless Internet-protocol-based communications network comprising one or more wireless communications standards; for example, 4G and/or 5G Long Term Evolution (LTE), Ultra Mobile Broadband (UMB), WiMax (IEEE 802.16), long range spread spectrum modulation (LoRa), and the like. Mobile electronic device 218 may be configured to communicate the plurality of safety and/or compliance inputs from mobile application 220 to compliance and access server 230 via wireless communications network 224.

In accordance with certain embodiments, compliance and access server 230 may be operably engaged within a network operations center (NOC) 226 environment. NOC 226 may comprise a computing environment through which control and network management may be exercised over a plurality of electronic access locks 238 and a plurality of mobile electronic devices 218 operating in communication with wireless communications network 224. In certain embodiments, wireless communications network 224 may comprise a private network. NOC 226 may comprise a firewall 228, compliance and access servers 230 and compliance and access database 234. An administrator or compliance-user computing device 244 may be operably engaged with compliance and access servers 230 inside of NOC 226 to enable an administrator to control and manage the network, as well as control and manage compliance and access to electronic access lock 238 via compliance and access servers 230. Firewall 228 may comprise any combination of firewall elements and configurations being configured to prevent unauthorized access to or from NOC 226 under a set of designated security protocols. Firewall 228 may be configured as a hardware or software form, or a combination of both. Firewall 228 may comprise one or more security layers configured to ensure all communications entering or leaving NOC 226 are in compliance with specified security criteria.

Compliance and access servers 230 may comprise a safety and compliance software application 232. Safety and compliance software application 232 may be a server-side configuration of safety and compliance mobile application 220 and a safety and compliance administrator application 242. Safety and compliance mobile application 220 may be a client-side configuration executing on mobile electronic device 218 (i.e. a field technician client device); and safety and compliance administrator application 242 may be a client-side configuration executing on computing device 244 (i.e., an administrator client device 244). Safety and compliance software application 232 may comprise a business rules engine configured to determine whether one or more conditions required to grant access to access-restricted area 214 are present or not present. Safety and compliance software application 232 may receive and process a plurality of data inputs according to static or dynamic business rules to determine whether a user requesting access to access-restricted area 214 is in compliance with the conditions under which access is granted to access-restricted area 214; and to determine whether it is safe for the user to obtain access to access-restricted area 214. The plurality of data inputs may comprise sensor data from sensor 210, user-generated data from safety and compliance mobile application 220, user-generated data and/or user-defined permissions/parameters from safety and compliance administrator application 242, historical data being stored in safety and compliance database 234, and/or third-party or external data via third-party or external servers 236. The business rules engine may be configured to process the plurality of data inputs to determine a SAFE/UNSAFE status for access-restricted area 214 and a COMPLIANT/UNCOMPLIANT status for the user requesting access to access-restricted area 214. Safety and compliance software application 232 may further comprise an access control module comprising logic for denying access to access-restricted area 214 in response to an UNSAFE and/or UNCOMPLIANT condition, and/or granting access to access-restricted area 214 in response to a SAFE and COMPLIANT condition.

Third-party or external servers 236 may comprise one or more third-party servers, such as servers providing access to weather data, or external servers, such as customer servers that might provide data related to a specific service-site or service technician, service request tickets, and the like.

Third-party or external servers 236 may be communicably interfaced with compliance and access servers 230 via an application programming interface (API) configured to exchange data in accordance with certain request parameters. Compliance and access database 234 may store data inputs, access requests, and access determinations such that a user of safety and compliance administrator application 242 may query compliance and access database 234 for the purpose of generating an audit report associated with access requests and access permission for access-restricted area 214.

Figure 3:
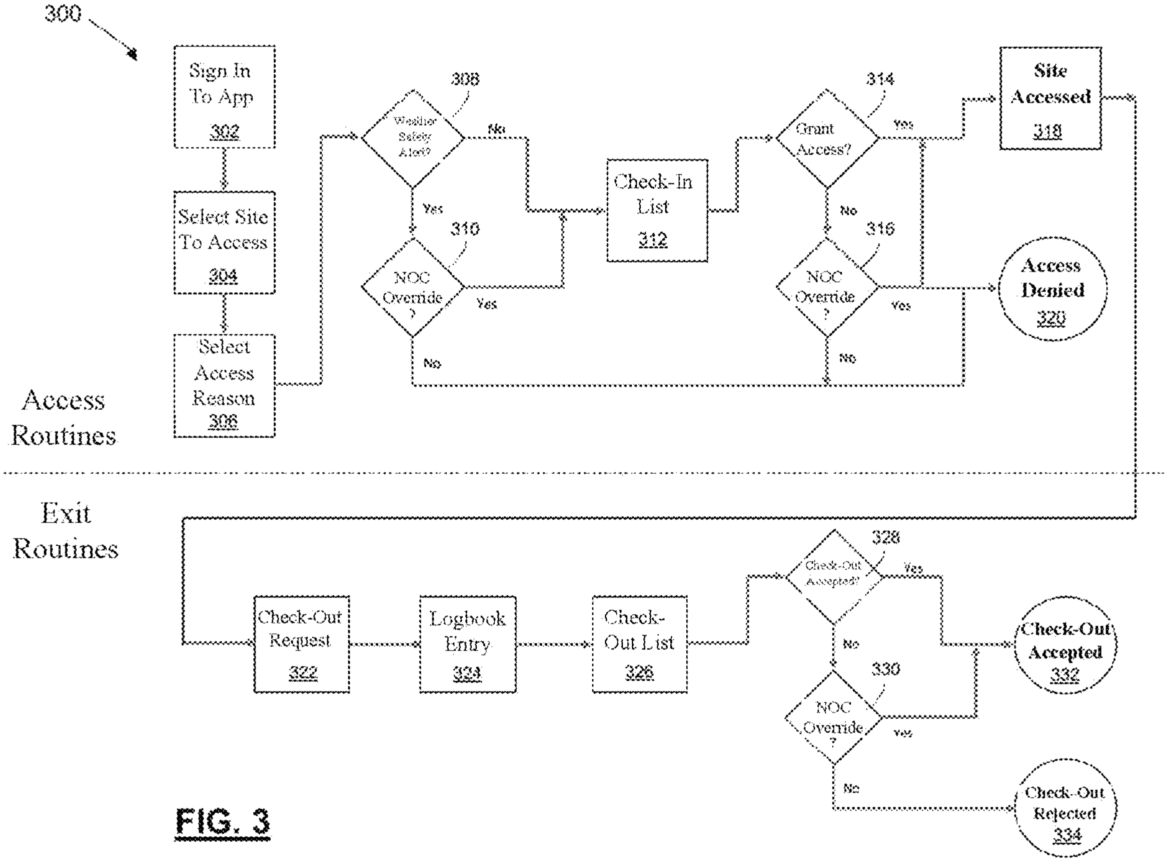
FIG. 3 is a process flow diagram of a situationally conditional electronic access control system, in accordance with an aspect of the present disclosure.
Figure 4:
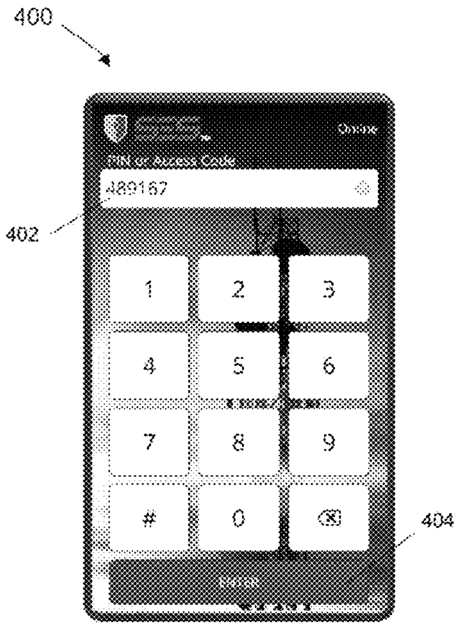
FIG. 4 is a diagram of a mobile graphical user interface of a situationally conditional electronic access control system, in accordance with an aspect of the present disclosure.
Figure 5:
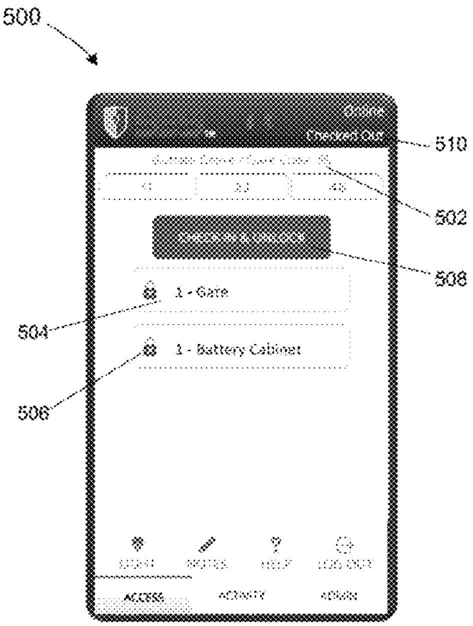
FIG. 5 is a diagram of an additional mobile graphical user interface thereof.
Figure 6:
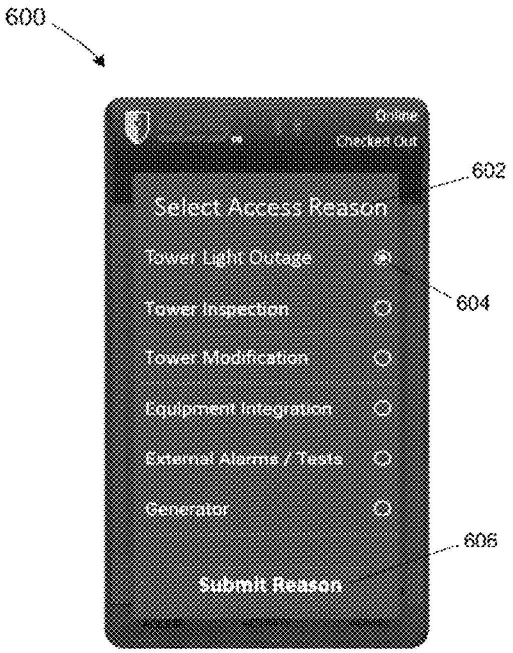
FIG. 6 is a diagram of an additional mobile graphical user interface thereof.
Figure 7:
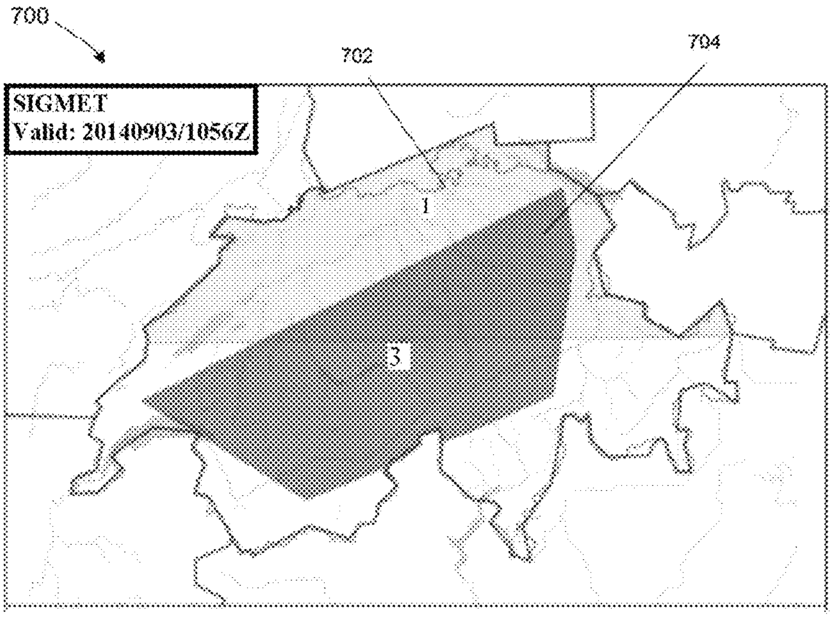
FIG. 7 is a diagram of an external interface to geographic weather conditions.
Figure 8:
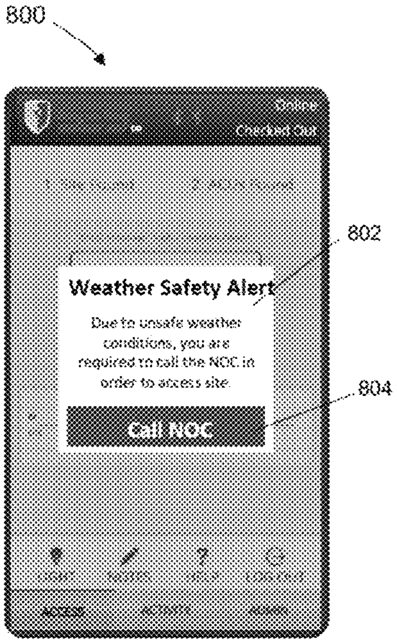
FIG. 8 is a diagram of a mobile graphical user interface of a situationally conditional electronic access control system, in accordance with an aspect of the present disclosure.
Figure 9:
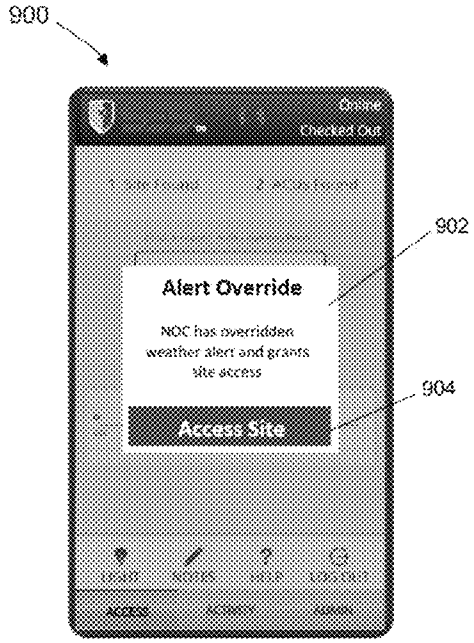
FIG. 9 is a diagram of an additional mobile graphical user interface thereof.
Figure 10:
FIG. 10 is a diagram of an additional mobile graphical user interface thereof.
Figure 11:
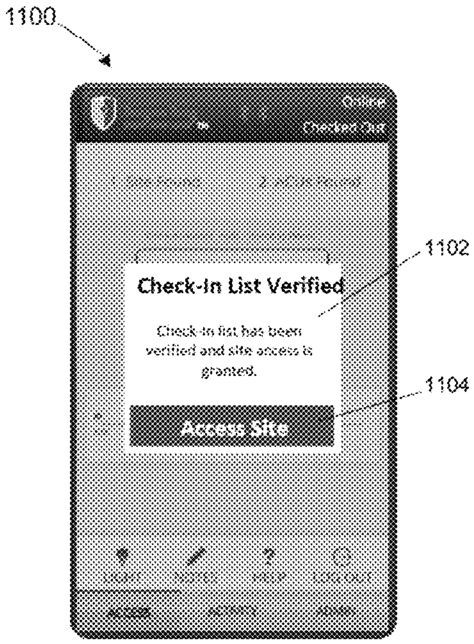
FIG. 11 is a diagram of an additional mobile graphical user interface thereof.
Figure 12:
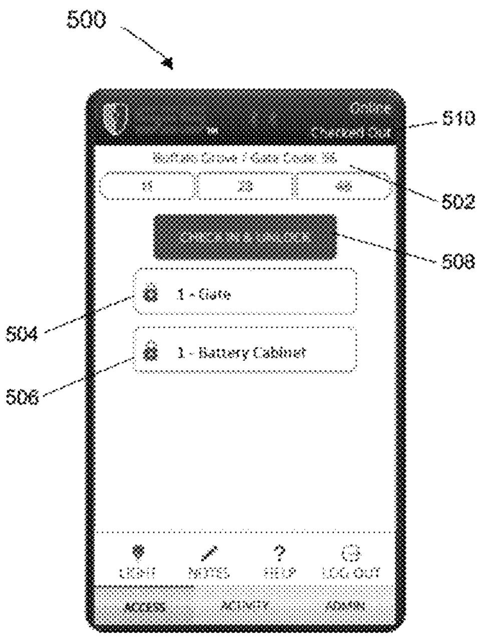
FIG. 12 is a diagram of an additional mobile graphical user interface thereof.
Figure 13:
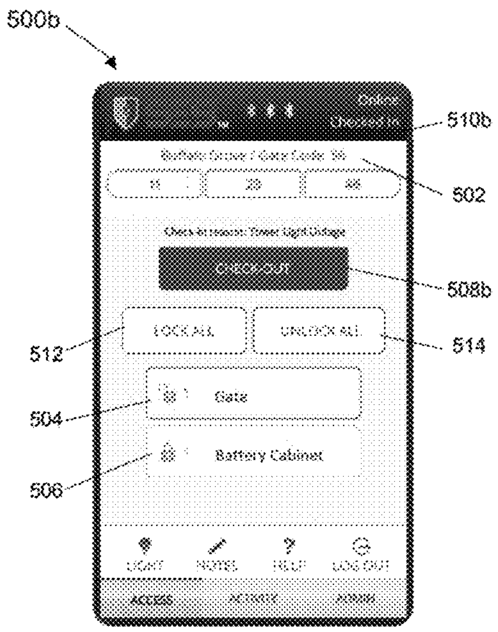
FIG. 13 is a diagram of an additional mobile graphical user interface thereof.
Figure 14:
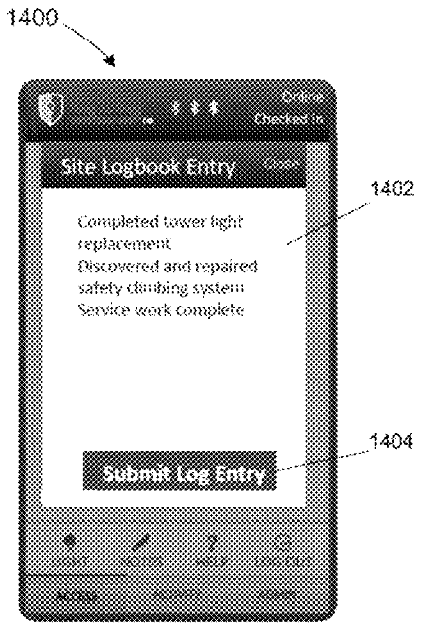
FIG. 14 is a diagram of an additional mobile graphical user interface thereof.
Figure 15:
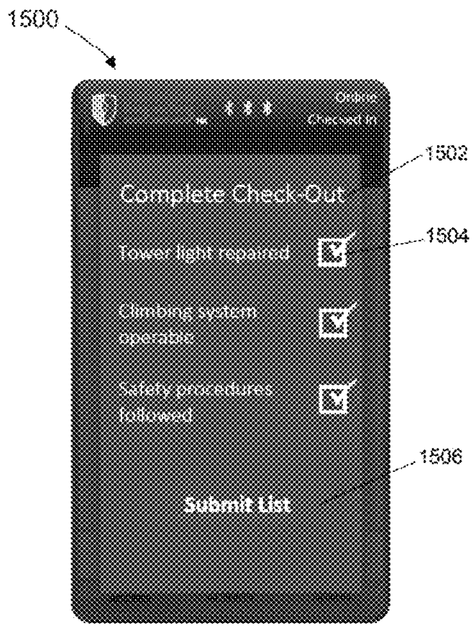
FIG. 15 is a diagram of an additional mobile graphical user interface thereof.
Figure 16:
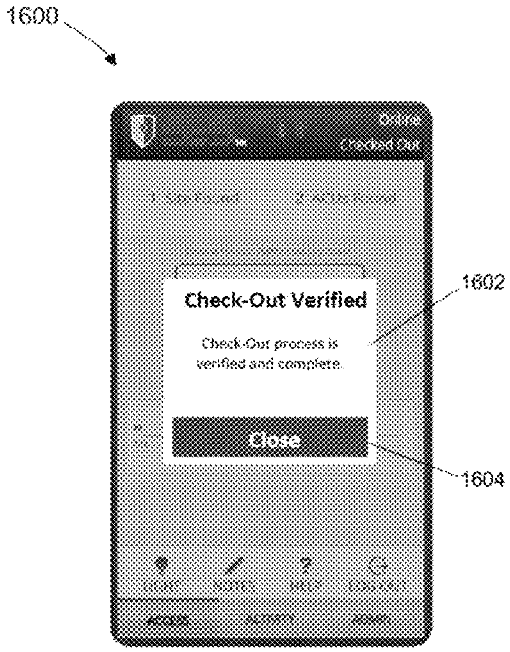
FIG. 16 is a diagram of an additional mobile graphical user interface thereof.
Figure 17:
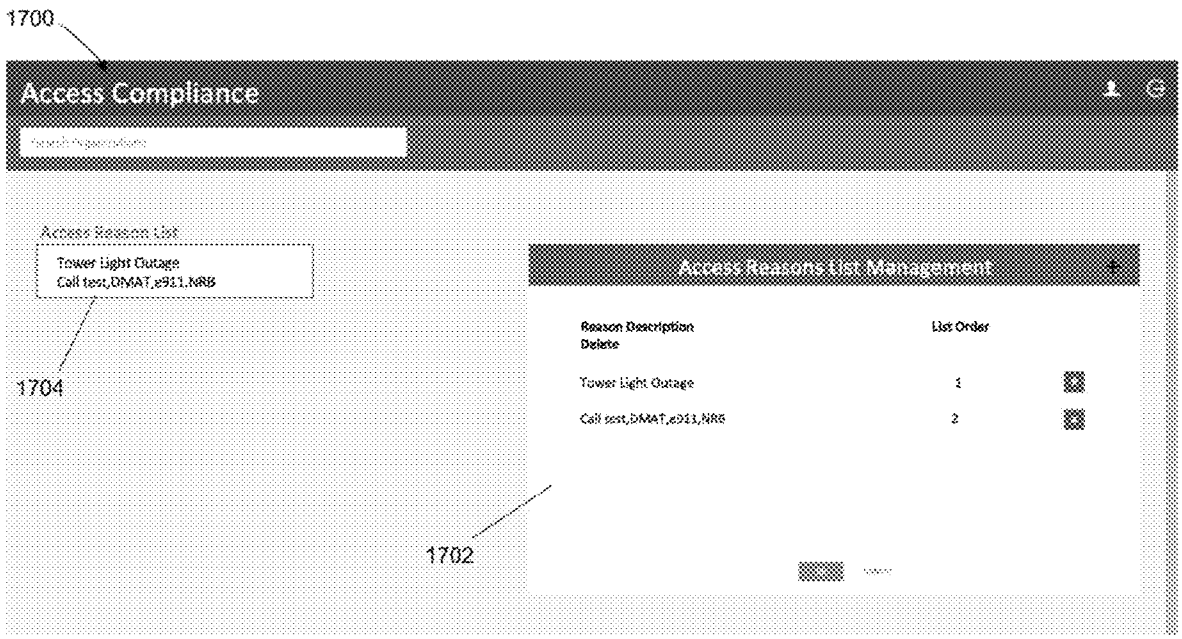
FIG. 17 is a diagram of a graphical user interface, in accordance with an aspect of the present disclosure.
Figure 18:
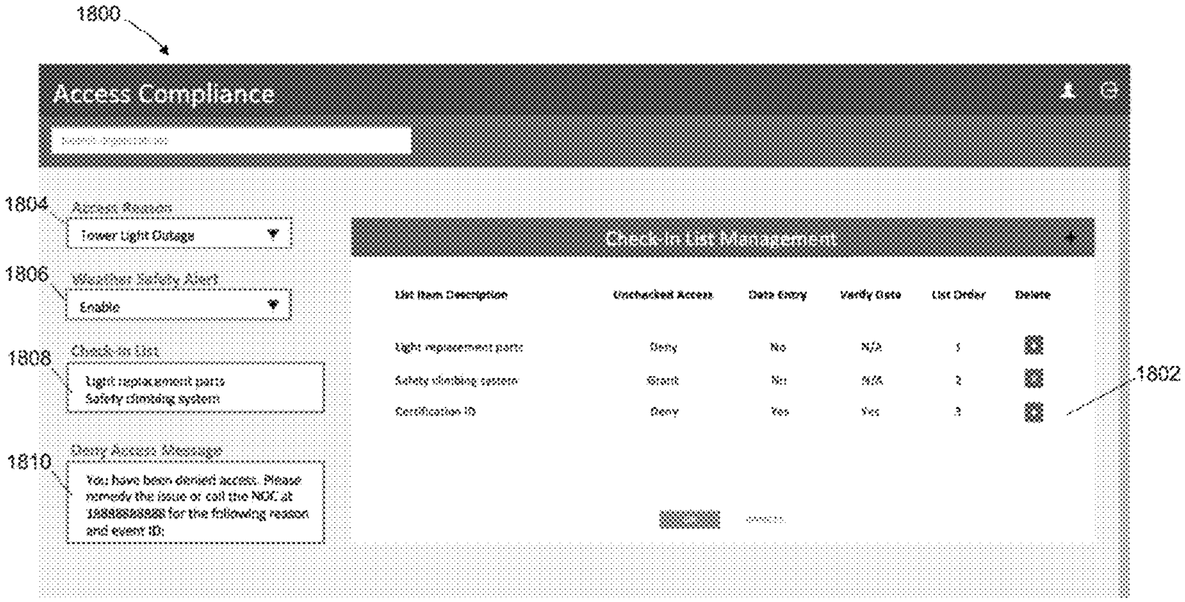
FIG. 18 is a diagram of a graphical user interface, in accordance with an aspect of the present disclosure.
Figure 19:
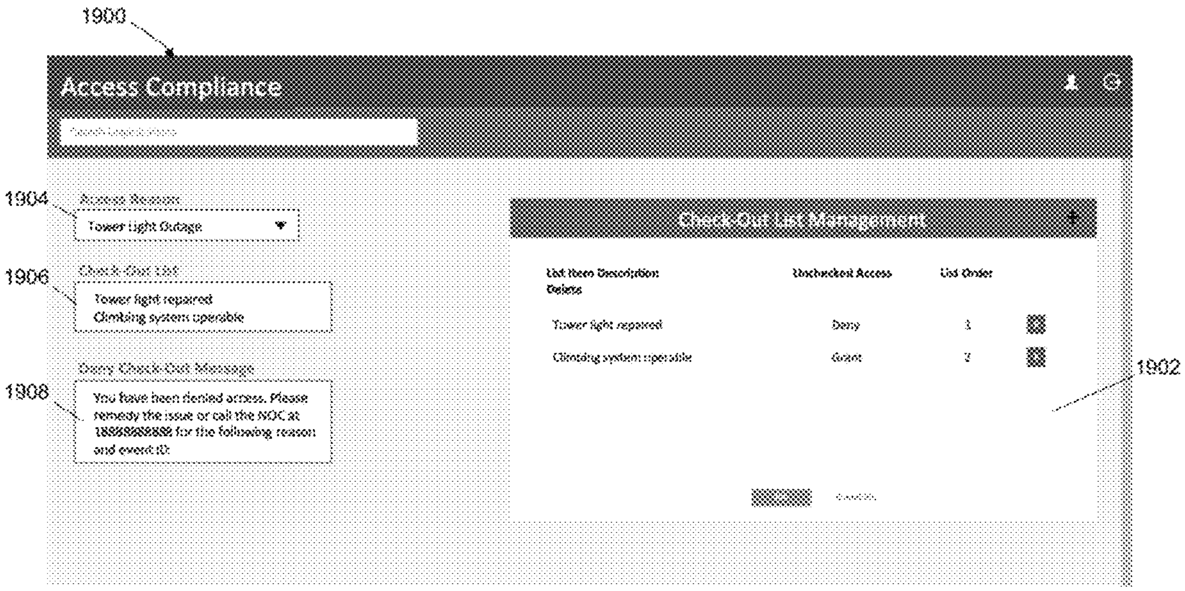
FIG. 19 is a diagram of a graphical user interface, in accordance with an aspect of the present disclosure.
Figure 20:
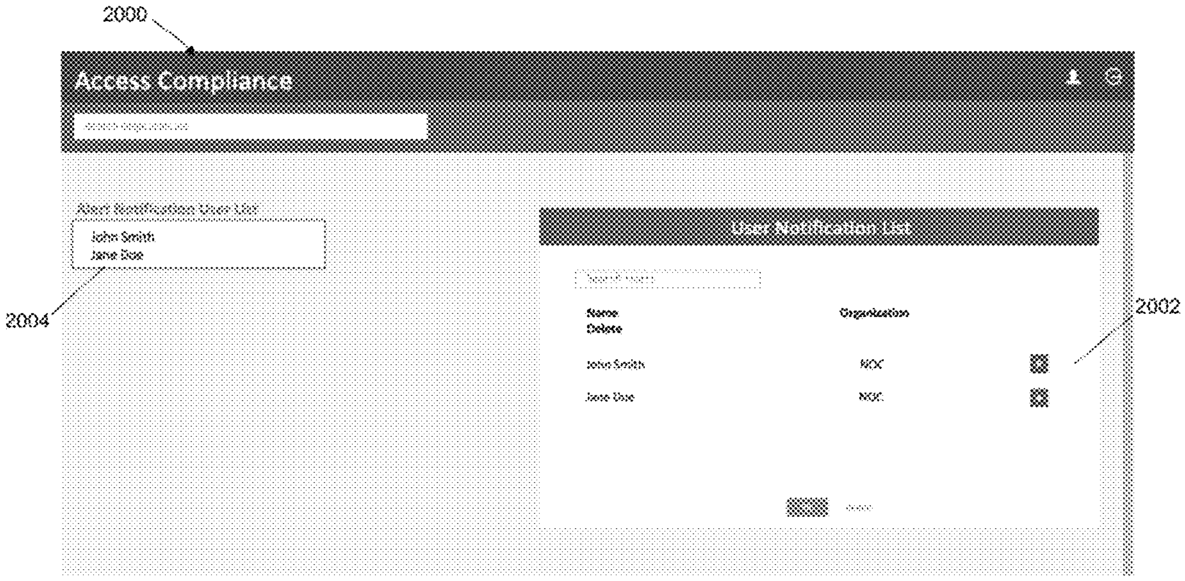
FIG. 20 is a diagram of a graphical user interface, in accordance with an aspect of the present disclosure.
Figure 21:
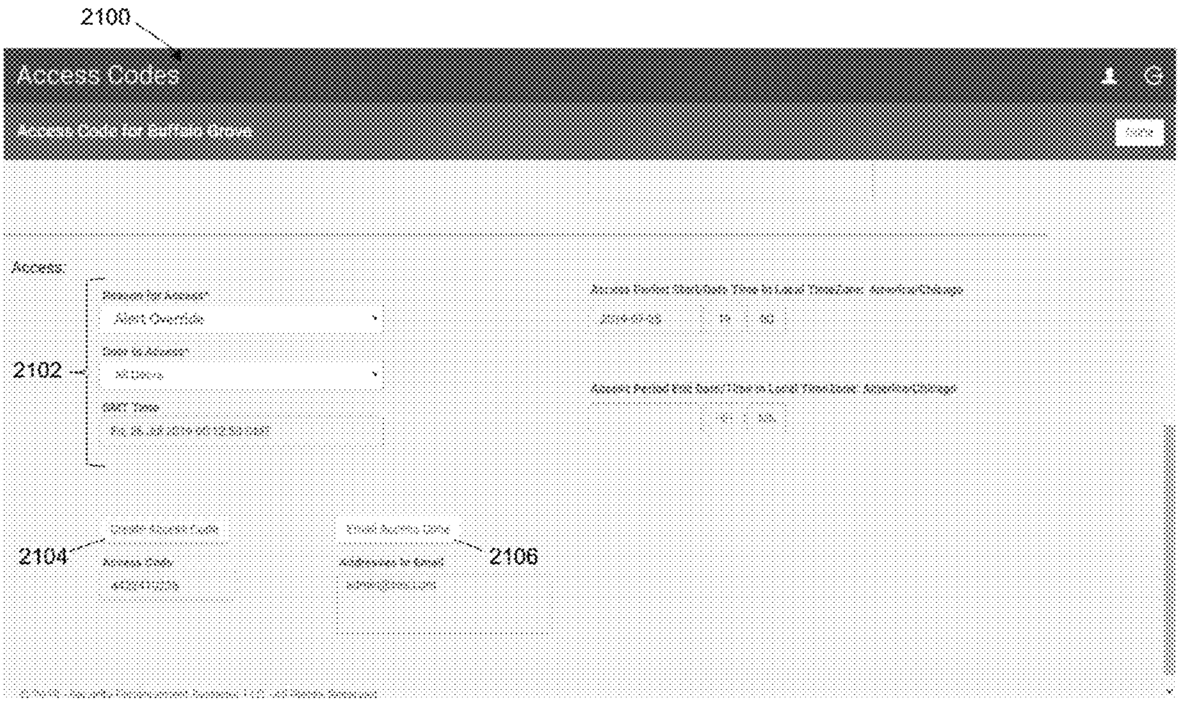
FIG. 21 is a diagram of a graphical user interface, in accordance with an aspect of the present disclosure.
Figure 22:
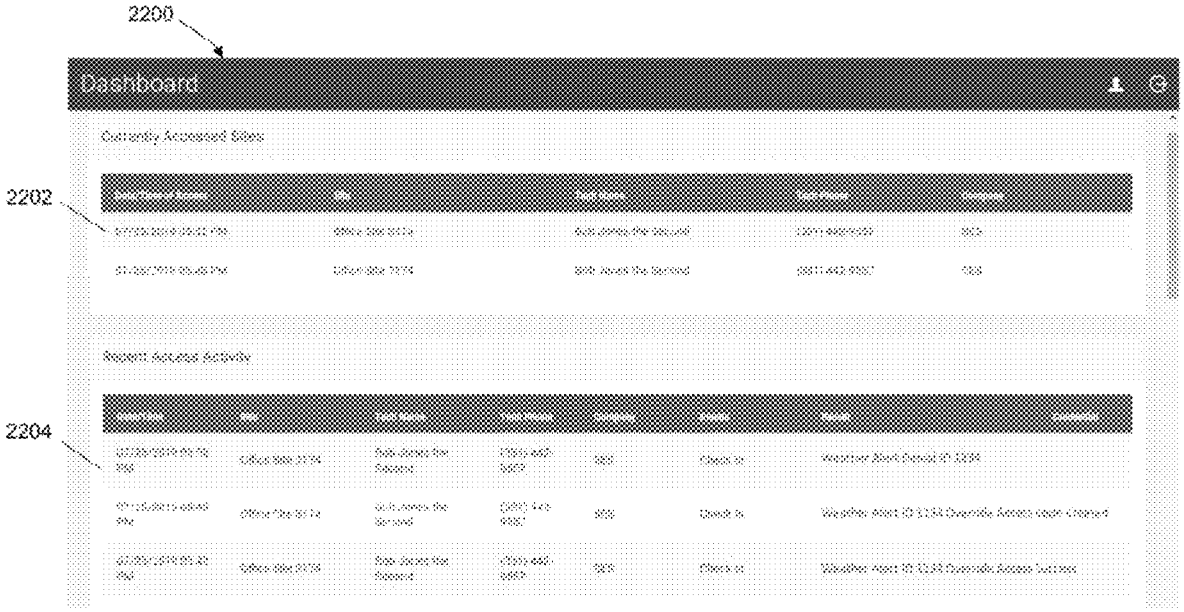
FIG. 22 is a diagram of a graphical user interface, in accordance with an aspect of the present disclosure.
Figure 23:
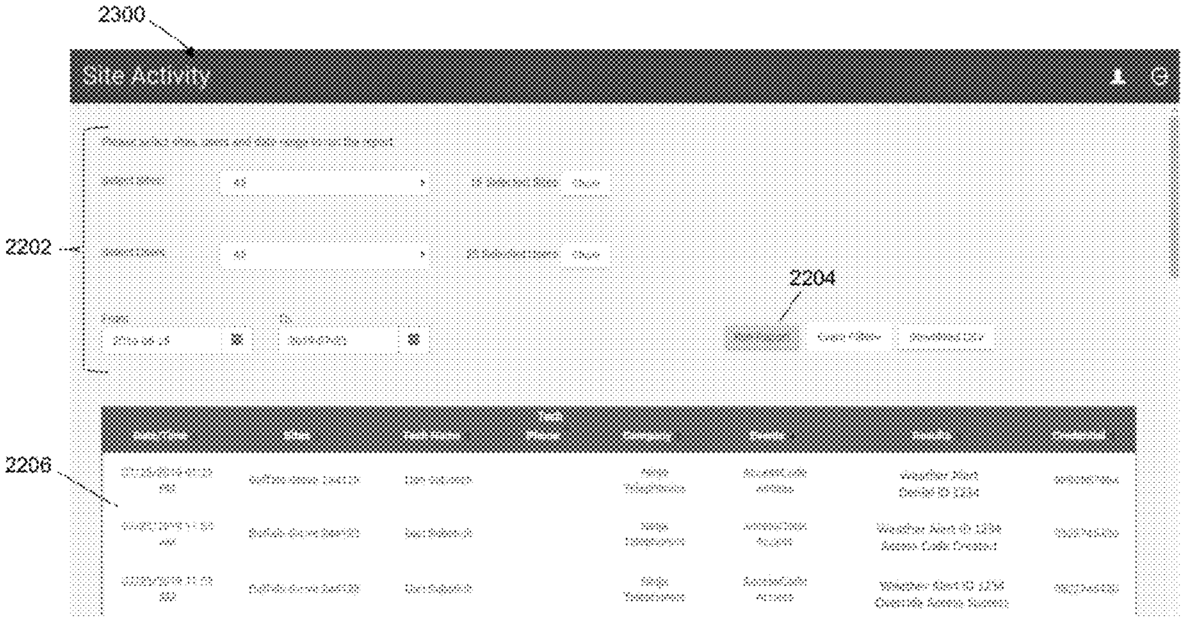
FIG. 23 is a diagram of a graphical user interface, in accordance with an aspect of the present disclosure.

Referring now to FIG. 3, a process flow diagram of a situationally conditional electronic access control system 300 is shown. In accordance with an aspect of the present disclosure, a user may launch a safety and compliance mobile software application executing on a mobile electronic device, and input user credentials via a user interface to sign-in to the application 302. The mobile software application may verify the user's credentials and initiate an instance of the mobile application on the mobile electronic device by providing a graphical user interface comprising a plurality of interface elements. The interface elements may comprise one or more elements for selecting a specific site for which to request access via an electronic access control system comprising an electronic lock. In accordance with certain embodiments, the user selects the site desired to be accessed via the electronic lock 304. The user then provides an input, via the graphical user interface, corresponding to an access reason for the selected site (e.g. a service code) 306. The mobile electronic device communicates the site request and the access reason inputs to the application server residing within the NOC to determine if there is a weather safety alert for the selected site and the selected reason. For example, if a service technician is requesting access to a communications tower for the purpose of changing a lightbulb on the tower, then a different set of weather parameters may be applied versus an access request for the purpose of servicing a base station. The application server may query a third-party or external server to obtain weather data/forecast for the requested site. If a weather safety alert IS present for the site according to the designated weather safety parameters (e.g. proximity of rain, lighting, wind speed threshold, Convective SIGMET, etc.) 308, system 300 may route the request an administrator client within the NOC for a review and an override determination by an administrator user 310. If a weather safety alert for the site IS NOT present according to the designated weather safety parameters, then system 300 may provide a permission to the mobile electronic device to display a graphical user interface to the user comprising a check-in workflow 312. If the access request is routed to the administrator client within the NOC, the administrator user may review the compliance determination and determine whether to override the compliance determination. If the administrator user does not override the compliance determination, then system 300 may communicate a denial to the mobile electronic device and safety and compliance mobile software application may display an access denial message to the user. In certain embodiments, system 300 may function to temporarily disable standard access control configurations for the user requesting access; for example, the NOC may temporarily disable the user's access code or key card until safety and compliance is verified. If the administrator user overrides the weather denial, then system 300 may provide a permission to the mobile electronic device to display a graphical user interface to the user comprising a check-in workflow 312. Check-in workflow 312 comprises a plurality of user prompts configured to prompt a plurality of user inputs to verify a user's compliance status with a plurality of compliance parameters associated with the requested site and access reason. For example, if the user is requesting access to a site for the purpose of changing a lightbulb on the cell tower, the compliance workflow may be configured to determine whether the user is up to date on relevant safety certifications, insurance certificates, and presence of personal protective equipment and climb gear. Upon completing the check-in list workflow 312, the user inputs are communicated to the application server residing in the NOC and processed according to a business rules engine residing on the application server. If the user inputs are in compliance with the compliance rules, system 300 may communicate an access permission to the mobile electronic device and grant access to the site 318. If the user inputs are NOT in compliance with the compliance rules, system 300 may deny access to the site and route the request to an administrator client device residing within the NOC for a review and override determination by the administrator user. The administrator user may review the user inputs and the compliance determination generated by the business rules engine and determine whether to override the access denial. System 300 may enable the administrator user to further verify user compliance and/or make a compliance determination that differs from the compliance determination generated by the business rules engine. If the administrator user determines that the requesting user satisfies the compliance parameters for site access, the administrator user may provide an override input. If the NOC overrides the access denial, then system 300 may communicate an access permission to the mobile electronic device and grant access to the site 318. If the administrator user determines that the requesting user does NOT satisfy the compliance parameters for site access, the administrator user may provide an access denial input (or do nothing). If the NOC does NOT override the access denial, then system 300 may communicate an access denial to the mobile electronic device and deny access to the site 320.

In accordance with certain embodiments, if the access request is granted 314, the mobile electronic device establishes a wireless communications interface with the electronic access control system comprising the electronic lock and communicates an access key to the electronic access control system to actuate a locking mechanism of the electronic lock to an unlocked or disengaged configuration. Once the electronic lock is unlocked or disengaged, the user may access the site 318.

If the user is granted access to the site, system 300 may be optionally configured to execute an exit workflow to ensure compliance measures and standard operating procedures are observed by the user upon exiting the site. In accordance with certain embodiments, the safety and compliance mobile software application is configured to present a graphical user interface to the user comprising one or more interface elements configured to present a check-out request element to the user. The user may provide an input to the safety and compliance mobile software application via the graphical user interface to initiate a check-out request 332. Upon initiating the check-out request, the safety and compliance mobile software application may be further configured to provide interface elements configured to provide the user with a digital logbook associated with the site and prompt the user for a logbook entry associated with the site visit. The check-out workflow continues with the user inputting a logbook entry into the safety and compliance mobile software application via the graphical user interface 324.

Upon receiving the logbook entry, the safety and compliance mobile software application presents the user with interface elements configured as a check-out list 326. The check-out list may provide a plurality of input prompts corresponding to a plurality of standard operating procedures or other compliance requirements. Upon receiving the plurality of check-out list inputs from the user, system 300 communicates the plurality of inputs to the application server residing within the NOC. The application server processes the plurality of inputs via the business rules engine to make a compliance determination in accordance with the check-out rules 328. If the business rules engine determines that the check-out request is in compliance with the check-out parameters, system 300 accepts the check-out request and communicates a check-out confirmation to the mobile electronic device. If the business rules engine determines that the check-out request is NOT in compliance with the check-out parameters, system 300 routes the check-out request to an administrator client within the NOC for an administrator user to review. System 300 may be configured to enable the administrator user to review the check-out list inputs and check-out compliance determination and determine whether to override the check-out denial and approve the check-out request. If the administrator user determines to override the check-out denial, the administrator user may provide an override input to the administrator client. The NOC may override the compliance denial in response to the override input by the administrator user and accept the check-out request 322. If the administrator user determines NOT to override the check-out denial, the administrator user may provide an input to the administrator client (or do nothing) to maintain the check-out denial. If the business rules engine determines that the check-out request is NOT in compliance with the check-out parameters and the administrator user does NOT override the check-out denial, the check-out request is rejected 334. System 300 may provide a check-out denial message to the mobile electronic device, and the safety and compliance mobile software application may provide one or more user prompts in response to the check-out denial via the graphical user interface.

Referring now generally to FIGS. 2 and 3, and in accordance with certain embodiments, system 300 may comprise one or more photograph capture workflow and/or video capture workflow being associated with one or more access routines and/or exit routines. As applied to access routines, a photo capture workflow and/or a video capture workflow may be initiated via an instance of safety and compliance mobile application 220 executing on mobile electronic device 218, wherein mobile electronic device 218 comprises a digital camera. In accordance with certain embodiments, the access request process or check-in workflow may include one or more compliance steps comprising a digital photograph or video capture workflow. In response to a check-in or access request by a user, a photograph and/or video capture workflow may be initiated by safety and compliance mobile application 220 comprising one or more user prompts to capture, via mobile electronic device 218, one or more digital images associated with one or more check-in or access conditions. The photograph and/or video capture workflow may prompt the user to capture one or more digital images of target subject(s) being associated with one or more site identifiers, user identifiers, site conditions, and/or compliance conditions in order to determine whether to grant an access request being initiated by the user. For example, digital images of the target subject(s) may comprise one or more digital images of the user requesting access to the site; a bar code or other identification number associated with identification of the site and/or access point being located at the site; one or more safety elements, such as an image or video of the user's climbing gear; one or more compliance elements, such as a video of the user inspecting or wearing the user's safety equipment; the presence or absence of one or more site conditions, such as a broken or malfunctioning component at the access site; the presence or absence of one or more environmental conditions, such as the presence of snow or ice at the access site; and the like. In some embodiments, safety and compliance mobile application 220 communicates the digital image(s) to NOC 226 for review and verification of the one or more site conditions to determine compliance with one or more compliance parameters. In some embodiments, compliance and access servers 230 may process and analyze the digital image(s) via optical character recognition or other machine vision means to determine the presence or absence of one or more compliance parameters at the access site to determine whether to grant or deny site access to the user. In other embodiments, NOC 226 may deliver the digital image(s) to compliance administrator application 242 for review by an administrator user to determine whether to issue an access override and grant access to the requesting user.

In accordance with certain embodiments, the exit request process (or check-out workflow) may include one or more compliance steps comprising a photograph or video capture workflow. In response to a check-out or exit request by a user, a photograph and/or video capture workflow may be initiated by safety and compliance mobile application 220 comprising one or more user prompts to capture, via mobile electronic device 218, one or more digital images comprising one or more photographs and/or videos being associated with one or more check-out or exit steps. The photograph and/or video capture workflow may prompt the user to capture one or more digital images of target subject(s) being associated with one or more site identifiers, user identifiers, site conditions, and/or compliance conditions in order to determine whether to grant a check-out request being initiated by the user. For example, digital images of the target subject(s) may comprise one or more digital images of the user requesting to check-out of the site; a bar code or other identification number associated with identification of the site and/or access point being located at the site; one or more safety elements, such as an image or video of the user's climbing gear; one or more compliance elements, such as a video of the user returning the user's safety equipment; the presence or absence of one or more after-service site conditions, such as a serviced component at the access site (e.g. a lightbulb); the presence or absence of one or more environmental conditions, such as the presence of snow or ice at the access site; and the like. In some embodiments, safety and compliance mobile application 220 communicates the digital image(s) to NOC 226 for review and verification in the check-out or exit process. In some embodiments, compliance and access servers 230 may process and analyze the digital image(s) via optical character recognition or other machine vision means to determine the presence or absence of one or more compliance parameters at the access site to determine whether to grant or deny the user's check-out request. In other embodiments, NOC 226 may deliver the digital image(s) to compliance administrator application 242 for review by an administrator user to determine whether to grant a check-out request and/or issue an override for a check-out request to the requesting user. In still further embodiments, NOC 226 may be configured to compare one or more digital images captured during the check-in workflow to one or more digital images captured during the check-out workflow to determine and/or verify one or more compliance conditions.

Referring now generally to FIGS. 4-22, and further in reference to certain elements shown and described in FIG. 2 but not shown in FIGS. 4-22, a graphical user interface of safety and compliance mobile application 220 executing on mobile electronic device 218 within situationally conditional electronic access control system 200 is shown. In accordance with various embodiments of the present disclosure, a graphical user interface of safety and compliance mobile application 220 may comprise a plurality of interface elements configured to enable a user of mobile electronic device 218 to request access to access-restricted area or enclosure 214 via electronic lock 238, provide a reason for the access request to NOC 226, provide a plurality of compliance inputs corresponding to the access location and the reason for access to NOC 226, access the access-restricted area via actuation of electronic lock 238, initiate a check-out workflow for access-restricted area or enclosure 214, provide a site logbook entry to the NOC 226, and provide a plurality of check-out inputs to NOC 226. In accordance with various embodiments of the present disclosure, a graphical user interface of safety and compliance administrator application 242 may comprise a plurality of interface elements configured to enable a user of administrator client device 244 to configure and manage a plurality of access reasons for safety and compliance mobile application 220, configure and manage a plurality of check-in lists for safety and compliance mobile application 220, configure and manage a plurality of check-out lists for safety and compliance mobile application 220, configure and manage a user notification and alert list, configure and send access codes for actuation of electronic lock 238, view and manage compliance events and override activities in real-time, and view past (historical) compliance events and override activities.

In accordance with various embodiments of the present disclosure, a graphical user interface of safety and compliance mobile application 220 executing on mobile electronic device 218 comprises a pin or access code interface 400 configured to enable a user to input a pin or access code 402 corresponding to the user and/or service site. In certain exemplary use cases, the user may be a field service technician (for example, a cell tower service technician) and the access location may be a gate, door, or other access-control structure associated with a field service site (for example, a cell tower site). Upon entering 404 pin or access code 402, safety and compliance mobile application 220 may provide a check-in interface 500 corresponding to a service site 502. Check-in interface 500 may comprise an identification and lock status of access-restricted enclosures 504,506 present at service site 502. Check-in interface 500 may comprise an interface element to show a check-in status 510 to the user corresponding the service site 502. Check-in interface 500 may comprise an interface element to check-in to the selected service site and unlock associated electronic lock(s) 508. Upon the user selecting interface element 508, safety and compliance mobile application 220 may determine whether the user has provided an access reason and whether the user has obtained a compliance determination from the NOC.

If the user has not provided an access reason and has not obtained a compliance determination from the NOC, safety and compliance mobile application 220 may display an access reason interface 600. Access reason interface 600 may comprise an access reason list 602 comprising interface elements for selecting one or more access reason input 604 and submitting the one or more access reason input 606. Upon submitting the access reason input 606, safety and compliance mobile application 220 is configured to communicate the access reason to this NOC 226 via mobile electronic device 218. The NOC may query, via the safety and compliance application server(s) 230, one or more external servers to obtain weather data 700 corresponding to the location of the service site. The weather data 700 may comprise data corresponding to a first access reason 702 and/or data corresponding to a second access reason 704. Based on the weather data 700 and the access reason 604, the NOC 226 may make a weather safety determination. Safety and compliance mobile application 220 may provide a weather safety interface 800 comprising a weather safety alert message 802 and interface element to initiate a phone call (or other communication) with a representative for NOC 226 (i.e. a system administrator and/or safety/compliance user). If the NOC overrides the weather safety access denial, safety and compliance mobile application 220 may provide an override alert interface 900 comprising an override alert message 902 and an interface element to request site access 904. Upon the user selecting the interface element to request site access 904, safety and compliance mobile application 220 may provide a compliance checklist interface 1000.

Compliance checklist interface 1000 may comprise a compliance checklist 1002 comprising a plurality of interface elements to enable a user to provide complete compliance checklist inputs 1004 corresponding to one or more check-out compliance parameters (e.g. acknowledgement(s) that compliance requirement(s) are satisfied) and/or other compliance inputs 1006 (e.g. a certification number for the technician). Upon inputting compliance checklist input 1004 and/or other compliance inputs 1006, a user may submit the inputs via a SUBMIT interface element 108. Compliance checklist 1002 may be statically or dynamically configured based on a variety of safety factors according to the service site and/or the access reason input. Illustrative examples of safety factors may include factors corresponding to: the category of service to be performed; compliance requirements for the service category; environmental status at the service site, such as weather; arc flash potentials and conditions; personal safety equipment usage; safety climbing system integrity; safety climb system tagout; fall protection plan with assessment of climbing facilities; potential intensity and duration of RF exposure; required certifications for service technician (i.e. user); insurance requirements; environmental and sustainability requirements; procedures to follow before, during and after the service work; management approval requirements; warning notifications; service documentation; existence of an indemnification agreement and/or other contractual privity; other safety related conditions; fall hazards; hazards associated with structural collapses; struck-by hazards; hazards associated with worker fatigue; electrical hazards; and injury hazards due to the use of sharp, heavy tools and materials.

Upon submitting 1008 compliance checklist inputs 1004 and/or other compliance inputs 1006, safety and compliance mobile application 220 initiates a protocol via mobile electronic device 218 to communicate inputs 1004, 1006 to safety and compliance application server(s) 230. Safety and compliance server(s) 230 process inputs 1004, 1006 according to one or more compliance rules (e.g. rules for verifying the presence of required equipment, rules for verifying the technician certification number is valid and active, etc.) to determine the user's compliance status according to inputs 1004, 1006. If the checklist inputs 1004 and/or other compliance inputs 1006 compliant according to the compliance rules, safety and compliance mobile application 220 may verify the user's check-in request and provide a check-in verification interface 1100 to the user. Check-in verification interface 1100 may comprise interface element(s) to provide a check-in verification and access determination to the user 1102, and interface element(s) for the user to navigate to the check-in interface for the service site 1104.

Upon selecting the interface element(s) for the user to navigate to the check-in interface for the service site 1104, safety and compliance mobile application 220 may display check-in interface 500. The user may engage interface element 508 to check-in to the selected service site. Upon engaging interface element 508, safety and compliance mobile application 220 verifies that the user has obtained the required compliance determination from NOC 226. If the compliance determination is verified, safety and compliance mobile application 220 checks-in the user to the selected service site and displays site access interface **500*b*. Site access interface 500*b* comprises an updated check-in status 510*b* to confirm that the user is checked-in to the service site. The user may view and unlock one or more electronic lock present at the service site by selecting, for example, a user interface element to unlock a first electronic lock associated with a first enclosure 504 and/or a second electronic lock associated with a second enclosure 506. Site access interface 500*b* may further comprise interface elements to unlock all electronic locks associated with the service site 514 and/or lock all electronic locks associated with the service site 512. Safety and compliance mobile application 220 may initiate a wireless communication to the selected electronics lock(s) being configured to actuate or disengage a locking mechanism to unlock the selected electronics lock(s). Site access interface 500*b* may update interface elements 504 and 506 to display a lock status for the first electronic lock and/or the second electronic lock. Site access interface 500*b* may be further configured to include interface element(s) for initiating a check-out workflow 508*b*. A user (service technician) may select the interface element(s) to initiate the check-out workflow 508*b*** upon completing the service work for the service site.

In response to the user selecting interface element(s) for initiating a check-out workflow **508*b*, safety and compliance mobile application 220 may display a logbook interface 1400. Logbook interface 1400 may comprise interface element(s) configured to prompt the user to generate a site logbook entry 1402 and interface elements(s) to submit the logbook entry 1404. In response to the user submitting the logbook entry 1404, safety and compliance mobile application 220 may display a check-out interface 1500. Check-out interface 1500 may comprise a check-out checklist 1502 comprising interface elements to enable a user to provide one or more check-out checklist inputs 1504 corresponding to one or more check-out compliance parameters. Check-out interface 1500 may further comprise an interface element configured to enable the user to submit the check-out checklist inputs 1506. Upon the user submitting 1506 the check-out checklist inputs 1504, safety and compliance mobile application 220 initiates a protocol via mobile electronic device 218 to communicate check-out checklist inputs 1504 to safety and compliance application server(s) 230. Safety and compliance server(s) 230 process check-out checklist inputs 1504 according to one or more check-out compliance rules to determine compliance status. If check-out checklist inputs 1504 are compliant according to the compliance rules, safety and compliance mobile application 220 may verify the user's check-out request and provide a check-out verification interface 1600 to the user. Check-out verification interface 1600 may comprise interface element(s) to provide a check-out verification to the user 1602, and interface element(s) for the user to close 1604 the instance of safety and compliance mobile application 220**.

In accordance with various embodiments of the present disclosure, safety and compliance administrator application 242 executing on administrator client device 244 may comprise a graphical user interface comprising a plurality interface elements configured to enable an administrator user and/or a compliance user to configure a plurality of compliance elements for safety and compliance mobile application 220 and/or view historical access and compliance data comprising at least one audit log corresponding to each access-controlled service site in a plurality of access-controlled service sites. In accordance with certain embodiments, a graphical user interface may comprise an administrator interface 1700 comprising user interface elements configured to enable an administrator user to create an access reason 1702 for use by safety and compliance mobile application 220; view a list of access reasons being stored in compliance and access database 234; and, manage (e.g. add or delete) access reasons being stored in compliance and access database 234. A graphical user interface may further comprise an administrator interface 1800 comprising user interface elements configured to enable the administrator user to manage a check-in list based on reason code 1802. Administrator interface 1800 may comprise interface elements configured to enable the administrator user to configure a check-in list for safety and compliance mobile application 220, including interface elements for selecting an access reason 1804, configuring a weather safety alert 1806, defining list elements of a check-in list 1806, and configuring a deny access message 1808.

In accordance with various embodiments, the graphical user interface of safety and compliance administrator application 242 may further comprise an administrator interface 1900 comprising user interface elements configured to enable the administrator user to create and manage the check-out list based on reason code for safety and compliance mobile application 220. Administrator interface 1900 may comprise interface elements configured to enable the administrator user to view and manage (e.g. add/configure and delete) check-out lists 1902. Interface elements may further comprise elements for configuring a check-out list comprising selecting an access reason 1904, defining list elements of a check-out list 1906, and configuring a deny check-out message 1808.

In accordance with various embodiments, the graphical user interface of safety and compliance administrator application 242 may further comprise an administrator interface 2000 comprising user interface elements configured to enable the administrator user to create and manage user notifications across system 200. Administrator interface 2000 may comprise interface elements configured to enable the administrator user to view and manage user notifications 2002, including adding users for alert notifications from a user list 2004.

In accordance with various embodiments, the graphical user interface of safety and compliance administrator application 242 may further comprise an administrator interface 2100 comprising user interface elements configured to enable the administrator user to create and send an access code with override reason to a technician user of safety and compliance mobile application 220. Administrator interface 2100 may comprise interface elements configured to enable the administrator user to define one or more access parameters 2102 comprising a reason for access, door(s) to access, an access period start time and an access period end time. The interface elements may further comprise elements to generate the access code 2104 and share the access code 2106.

In accordance with various embodiments, the graphical user interface of safety and compliance administrator application 242 may further comprise a system dashboard 2200 comprising interface elements configured to display current compliance events and override activities in real-time. Interface elements may comprise a list of current accessed sites 2202 and a list of recent access activity 2204. List of current accessed sites 2202 may include site access data comprising data and time of access, site identifier, technician name, technician contact information, and technician company. List of recent access activity 2204 2202 may include access activity data comprising access date and time, site identifier, technician name, technician contact information, technician company, access event(s), access/compliance results, and credentials.

In accordance with various embodiments, the graphical user interface of safety and compliance administrator application 242 may further comprise a system dashboard 2300 comprising interface elements configured to generate and display report(s) comprising historical data for compliance events and override activities. Interface elements may comprise elements for selecting sites, users, and date range to generate a report 2302, elements to enable the user to run/generate the report 2304, and elements to display the report 2306.

Figure 24:
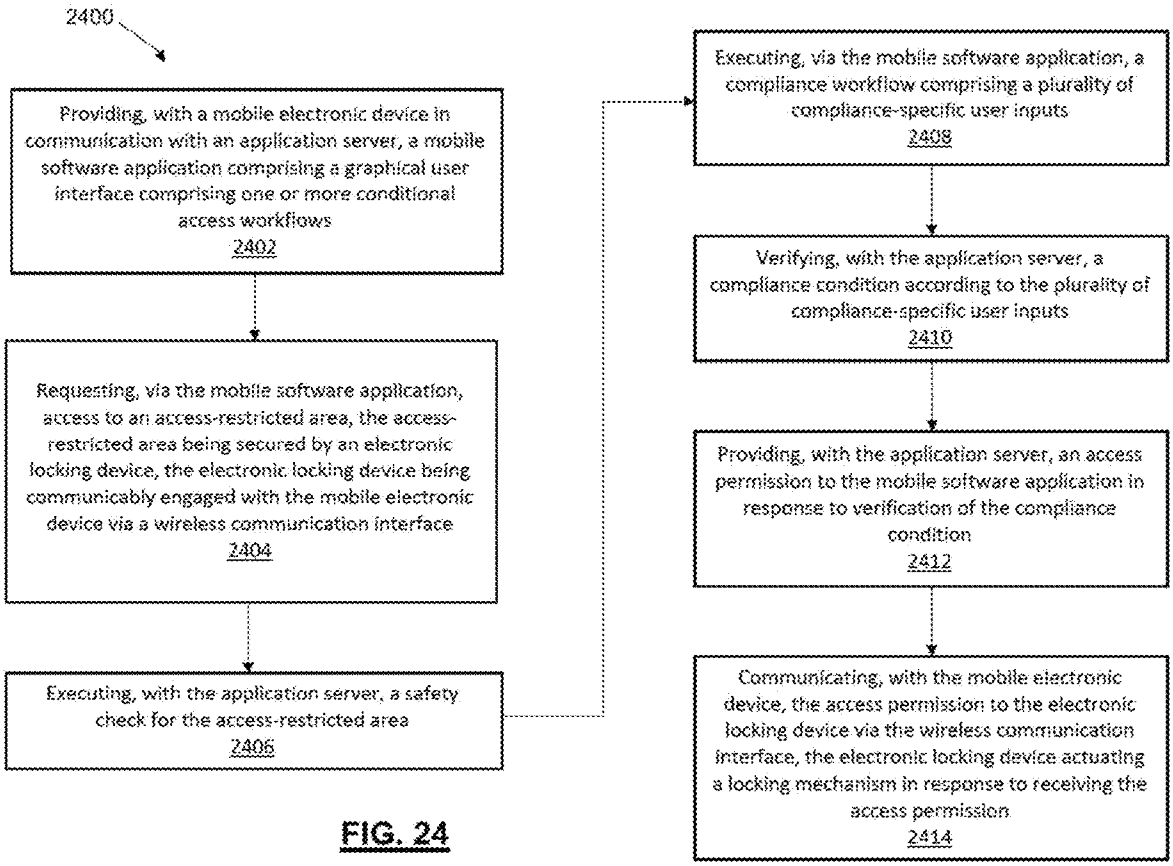
FIG. 24 is a diagram of a process flow diagram of a situationally conditional electronic access control method, in accordance with an aspect of the present disclosure.

Referring now to FIG. 24, a process flow diagram for a situationally conditional electronic access control method 2400 is shown. According to an embodiment, method 2400 comprises providing, with a mobile electronic device in communication with an application server, a mobile software application comprising a graphical user interface comprising one or more conditional access workflows 2402. The mobile software application then requests access to an access-restricted area, the access-restricted area being secured by an electronic locking device, the electronic locking device being communicably engaged with the mobile electronic device via a wireless communication interface 2404. The application server executes a safety check for the access-restricted area, the safety check comprising a weather safety level 2406. Method 2400 continues by executing, via the mobile software application, a compliance workflow comprising a plurality of compliance-specific user inputs, the compliance workflow being configured according to a location parameter and a reason code parameter 2408. The application server verifies a compliance condition according to the plurality of compliance-specific user inputs 2410. The application server provides an access permission to the mobile software application in response to verification of the compliance condition 2412. In accordance with certain embodiments, method 2400 may conclude by communicating, with the mobile electronic device, the access permission to the electronic locking device via the wireless communication interface, the electronic locking device actuating a locking mechanism in response to receiving the access permission 2414.

Exemplary Use Case

In accordance with various aspects of the present disclosure, embodiments of situationally conditional electronic access control system 200 may be utilized in an illustrative use case example where there is an antenna light bulb outage on a cellular communications tower. In accordance with this illustrative example, a service technician may arrive at the tower site and open an instance of a safety and compliance mobile application on a mobile electronic device, and request access to the service site. The mobile application may prompt the technician to enter a reason code for the access request; for example, Climb—Inspect, Climb—Install/Upgrade, Climb—Repair. Upon entering the reason code, the mobile application may provide a checklist associated with the reason code to the technician. In accordance with the present illustrative example, the checklist may be configured to prompt the technician to confirm/acknowledge certain compliance/safety elements. For example, Climb Training Active Credential, Insurance Certificate, personal protective equipment, Climb Gear, an acknowledgement that the climb system inspected and functional, and an acknowledgement that a fall protection plan is in place with assessment of the climbing facility. The user may submit the responses to the checklist prompts via the mobile application. The system may then assess a weather condition based on latitude and longitude of antenna to verify the presence of a weather safety condition; for example, whether the tower site is located within the bounds of a Convective SIGMET. If a weather safety condition is present, the system requires management approval for the technician to access the tower site. A weather warning may be displayed on the mobile application along with a message for the user contact the NOC for approval to proceed. The system denies access to the tower site until the technician has received an access override from the NOC. Upon a determination by an administrator/management user that weather safety or compliance conditions are sufficient for the technician to proceed, the NOC overrides the access denial and authorizes the technician to enter the service site. The system sends documentation to the technician related to safety compliance and access conditions related to the access request and associated site access. A message may by communicated when approval occurs, and the system may be further configured to generate one or more report providing access request and access data. Once the technician receives authorization to enter the service site based on the authorization/compliance/checklist information and/or the NOC authorization, the technician's mobile electronic device connects with a Bluetooth/wireless electronic lock controller and accesses the door. The Bluetooth/wireless electronic lock controller may comprise one or more environmental sensors that may be further operable to sense unsafe conditions related to accessing the service site. The system may be further configured to restrict access to the service site in response to sensor data indicating one or more unsafe conditions.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational phases to be performed on the computer or other programmable apparatus to produce a computer-implemented process such that the code portions which execute on the computer or other programmable apparatus provide phases for implementing the functions/acts specified in the flowchart and/or block diagram block(s). Alternatively, computer program implemented phases or acts may be combined with operator or human implemented phases or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that phases of the processes described herein may be performed in orders different than those illustrated in the flowcharts. In other words, the processes represented by the blocks of a flowchart may, in some embodiments, be in performed in an order other than the order illustrated, may be combined or divided, or may be performed simultaneously. It will also be understood that the blocks of the block diagrams illustrate, in some embodiments, merely conceptual delineations between systems, and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention is not to be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. An electronic access control method comprising:

presenting, with a mobile computing device communicably engaged with a network operating center server, a graphical user interface comprising one or more graphical elements configured to enable an end user of at least one end user device to request access to at least one secured location, wherein the at least one secured location comprises at least one electronic access control device configured to grant and restrict access to the at least one secured location;

receiving, via the graphical user interface, at least one first user-generated input from the end user, the at least one first user-generated input comprising an access request for the at least one secured location and an access reason identifier;

processing, with the mobile computing device or the network operating center server, the at least one first user-generated input to determine one or more safety and compliance parameters for the at least one secured location based on the access reason identifier;

configuring, with the mobile computing device or the network operating center server, a check-in workflow for the at least one secured location based on the one or more safety and compliance parameters;

presenting, with the mobile computing device via the graphical user interface, the check-in workflow for the at least one secured location to the end user;

receiving, with the mobile computing device via the graphical user interface, at least one second user-generated input from the end user in response to the check-in workflow;

processing, with the mobile computing device or the network operating center server, the at least one second user-generated input to determine whether the one or more safety and compliance parameters are satisfied;

denying, with the network operating center server, the access request in response to determining the one or more safety and compliance parameters are not satisfied, or granting, with the network operating center server, the access request in response to determining the one or more safety and compliance parameters are satisfied; and in response to granting the access request, commanding, with the mobile computing device or the network operating center server, the at least one electronic access control device to grant access to the at least one secured location.

2. The method of claim 1 further comprising configuring, with the mobile computing device in communication with the network operating center server, an electronic access code for the at least one electronic access control device in response to determining the one or more safety and compliance parameters are satisfied.

3. The method of claim 1 wherein the one or more safety and compliance parameters comprise one or more parameters selected from the group consisting of weather condition parameters, arc flash condition parameters, technician certification parameters, personal safety equipment parameters, and radio frequency exposure parameters.

4. The method of claim 1 further comprising retrieving, with the network operating center server, current or future weather data for a geographic area associated with the at least one secured location and processing the current or future weather data to determine whether the one or more safety and compliance parameters are satisfied.

5. The method of claim 1 further comprising communicating, with the mobile computing device in communication with the network operating center server, an override request to a network operating center administrator user in response to the denial of the access request.

6. The method of claim 5 further comprising communicating, with the network operating center server, an access permission to the mobile computing device in response to overriding the denial of the access request.

7. The method of claim 1 further comprising configuring, with the network operating center server, a check-out workflow comprising one or more check-out parameters for the at least one secured location.

8. The method of claim 7 further comprising receiving, with the mobile computing device communicably engaged with the network operating center server, at least one third user-generated input from the end user in response to the check-out workflow.

9. The method of claim 8 further comprising processing, with the mobile computing device or the network operating center server, the at least one third user-generated input in response to the check-out workflow to determine whether the one or more check-out parameters are satisfied.

10. The method of claim 9 further comprising comparing, with the mobile computing device or the network operating center server, one or more digital images captured during the check-in workflow to one or more digital images captured during the check-out workflow to determine whether the one or more check-out parameters are satisfied.

11. The method of claim 1 further comprising receiving, with the mobile computing device or the network operating center server, at least one sensor input from at least one sensor.

12. The method of claim 11 wherein the at least one sensor is configured to measure at least one safety-related or environmental condition for the at least one secured location.

13. The method of claim 12 further comprising processing, with the mobile computing device or the network operating center server, the at least one sensor input according to the one or more safety and compliance parameters.

14. The method of claim 12 wherein the at least one sensor comprises an arc sensor.

* * * * *